Fig. 1.

Inventors
Robert M. Barnhart,
James S. Tormey.

Attorneys.

Inventors
Robert M. Barnhart,
James S. Tormey.

Inventors
Robert M. Barnhart,
James S. Tormey.

Attorneys

Patented Nov. 28, 1944

2,363,851

UNITED STATES PATENT OFFICE 2,363,851

POWER-OPERATED AUTOMATIC SEMITRAILER

Robert M. Barnhart, Alhambra, and James S. Tormey, Temple City, Calif., assignors to Utility Trailer Manufacturing Company, Los Angeles, Calif., a corporation of California Application March 28, 1941, Serial No. 385,676

18 Claims. (Cl. 280—33.1)

This invention has reference to semi-trailers, and relates particularly to the system or mechanism by which the semi-trailer is coupled to and supported by the towing vehicle, and whereby the trailer is supported when uncoupled from the towing vehicle. A general purpose of the invention, in its typical form, is to provide a fully automatic system in which the coupling mechanism, the trailer support, and also preferably the trailer brakes, are all automatically interlocked and cooperated; in which the trailer support is power-operated, in coordination with the coupling mechanism, and preferably the brakes; in which accidental separation of the truck and trailer will cause setting of the trailer brakes and, or at least, the positioning of the trailer support in its operative position; and, generally, to provide a system which is highly reliable and fool-proof—a system in which it is almost impossible or highly improbable that any mistaken manual operation can lead to untoward results.

In some of the typical forms hereafter described in detail, the trailer brakes are cooperated with the coupler and the trailer support; but the invention envisages the automatic co-ordination of a power operated support with the coupler mechanism, whether or not the brakes are included in the coordinated system. If the brakes are so included, then the power source for support operation is conveniently the same as that for brake operation. However, the power operation of the support, coordinated with the coupler, may be independent of the brakes.

There are many other objects and purposes of the invention, but those, together with the characteristics of the invention itself will be best understood from the appended detailed description of preferred forms of coordinated system and preferred details, reference for this purpose being had to the accompanying drawings, in which.

In the drawings the rear end of a truck frame is illustrated at 20, carrying a usual form of tilting support 21 (in the form of a saddle or fifth-wheel member), this support carrying the king-pin 22. When the parts are in normal, locked and towing relation, king-pin 22 is locked to the forward end of the trailer by a locking mechanism which is generally designated by numeral 23 in Figs. 1 and 2. In this locked position, the king-pin is located at some substantial distance back of the forward end 24a of trailer frame 24, having passed back to this position through a longitudinal slot 25 in a plate (fifth-wheel member) 26 on the under side of the trailer frame. When the locking mechanism 23 is unlocked to allow the truck to be disengaged from the trailer, or if for any reason king-pin 22 becomes freed, the king pin must move forwardly a considerable distance with relation to the trailer before the forward end of trailer frame 24 reaches a position toward the rear where the saddle 21 will tilt downwardly to lower the trailer, or where the trailer will drop off the saddle.

The trailer has the usual rear wheels 30 and is equipped with suitable movable supporting means for the forward end of its frame. As here illustrated the supporting means comprises a leg or legs 31 pivoted at their upper ends to the trailer frame on cross-shaft 32 and carrying a wheel or wheels 33 at their lower swinging ends. The supporting legs are shown in full lines in Fig. 1 in their lowered or operative positions, ready to support the trailer when it is dropped off the truck. The dotted lines in this figure show the supporting legs in their raised or inoperative position ready for travel.

As here illustrated in preferred form the mechanism for raising and lowering the supporting legs comprises an interpivoted pair of links 34, 35, pivoted at 36 to the supporting legs and mounted on a transverse operating shaft 37 which is carried on the trailer frame. An operating arm 38 is mounted on shaft 37, and piston rod 39 is pivotally connected to the end of arm 38. The piston rod is attached to piston 40 in cylinder 41, and the cylinder may preferably be pivotally hung, as illustrated, upon the same shaft 32 which carries supporting legs 31.

In the lowered operative position of the supporting legs they are somewhat forward of a vertical position under their pivot 32, so that weight placed upon the supporting legs tends to move their lower ends further forwardly, putting a tension on links 34, 35 and tending to straighten those links out. The links thus positively prevent further forward swinging of the supporting legs under load. And if for any reason a rearward force is brought to bear on the supporting legs, rearward movement of the legs is prevented by the fact that the links in their full line positions are slightly below a straight line between 36 and 37, and inter-engaging stops 43 prevent the links from breaking further downwardly.

Figure 1:
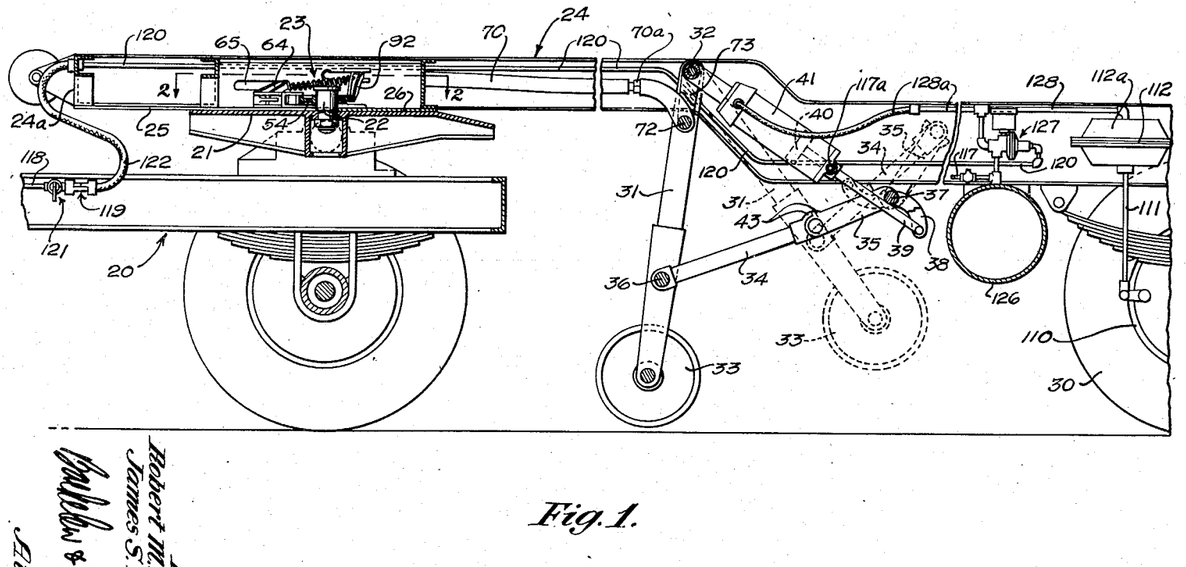
Fig. 1 is a longitudinal vertical section showing the rear end of a towing truck and the forward end of a trailer, equipped with one form of our improved system, in an illustrative and preferred form.

Rearward and upward movement of the supporting legs to the dotted line inoperative position is effected by power movement of piston 40 upwardly and toward the left in Fig. 1, which swings arm 38 and links 34 and 35 to the positions shown in dotted lines in that figure. In this latter position links 34 and 35 make but a small angle with each other so that the weight of supporting legs 31 has no great tendency to rotate the transverse shaft 37. This arrangement results in that no great force is necessary to hold the supporting legs in their upper inoperative position, whether that force be applied via piston 40 or applied directly to the supporting legs or to any other part of the support operating system.

Figure 2:
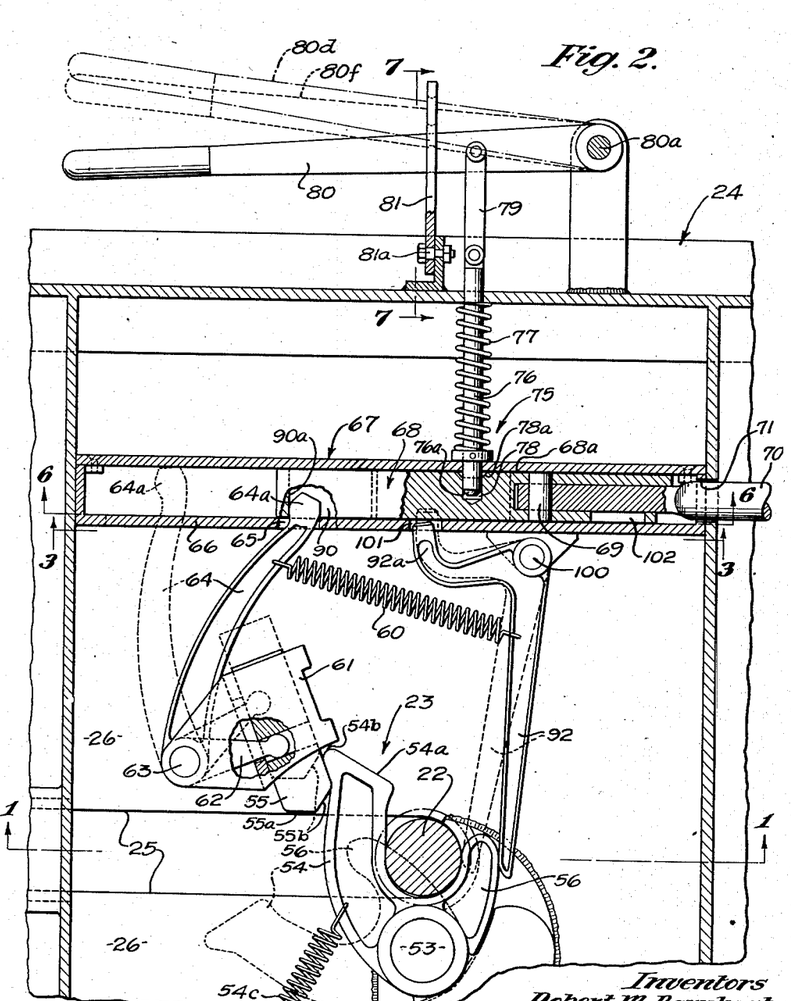
Fig. 2 is an enlarged fragmentary section taken as indicated by line 2—2 on Fig. 1 and showing, in plan aspect, the king pin lock and the mechanism which performs the function of co-operating and interlocking the king-pin lock and the trailer support; this figure showing the parts in their normal positions which they assume when the trailer support is raised to the dotted line position of Fig. 1.
Figures 6, 8, 9:
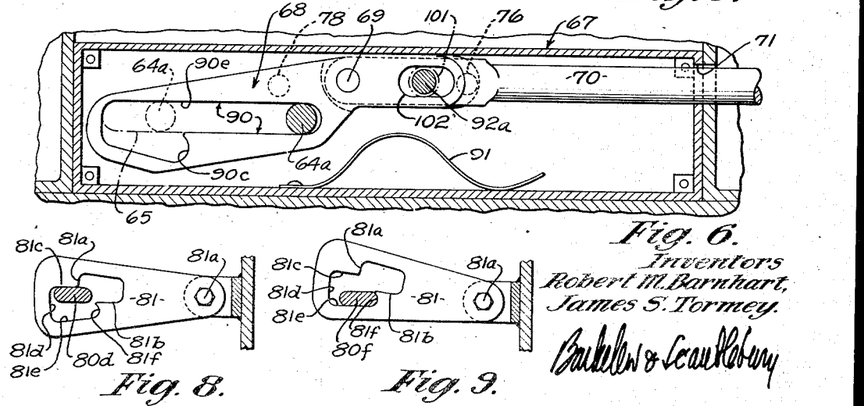
Figs. 8 and 9 are similar views showing the parts of Fig. 7 in different operating positions.
Figure 7:
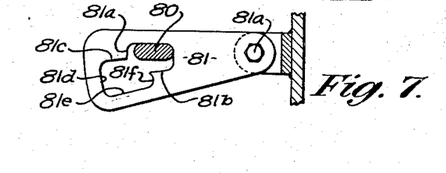
Fig. 7 is a detail section taken as indicated by line 7—7 on Fig. 2 showing the parts in the full line position of that figure.

The locking mechanism indicated at 23 in Figs. 1 and 2, and the interlocking mechanism shown in Figs. 2 to 6 will next be described in sufficient detail to set out their general functions. These mechanisms, except for certain manual locking parts which are shown in Figs. 2 and 7 form, in and by themselves, no part of our present invention. They form an element or elements of the several characteristic combinations which comprise our invention; but of themselves they form the subject-matter of an application Ser. No. 348,394 filed on July 30, 1940, by Percival M. Heinmiller and Charles F. Roginson and issued as Patent No. 2,305,704 on December 22, 1942. The general function of these mechanisms, as will hereinafter appear, is so to interlock the king-pin lock and the trailer supporting legs that neither can move except under the control of the other.

As best shown in Fig. 2 an upright pivot-pin 53 is mounted directly or indirectly on plate 26 and forms the pivot for the horizontally swinging locking dog 54 behind which king-pin 22 is locked. This locking dog swings between the open position shown in dotted lines in Fig. 2 and the closed position shown in full lines in that figure, being held in the closed position by latch bolt 55. The rearward end of slot 25 in plate 26 forms a limit stop for the rearward movement of king-pin 22 with relation to the trailer. A finger 56 is integrally connected with locking dog 54 and swings with it, so that when the locking dog is in its open position the finger lies in a position across slot 25, and the rearwardly moving king-pin strikes the finger and moves it and the locking dog to the full line positions of Fig. 2. As dog 54 swings to its closed position, the beveled surface 54a at its outer end engages beveled surface 55a of latch bolt 55, pushing the latch bolt rearwardly in its slide guide 61 against the tension of a spring 60 and the spring then forces latch bolt 55 to its latching position, shown in full lines in Fig. 2, as soon as the locking dog has passed the latch bolt. The king-pin 22 is thus fully locked in draft relation to the trailer, the forward end of the trailer is locked in supported relation on truck saddle 21, and those relations cannot be changed and the king-pin released for forward separative movement from the trailer until latch bolt 55 is withdrawn.

One arm 62 of a bell crank lever, whose other arm is 64, engages latch bolt 55. The lever is pivoted at 63 and its longer arm 64 has an end 64a which moves back and forth longitudinally between the rearward and forward positions such as shown in full and dotted lines in Fig. 2. The lever end 64a projects through a longitudinal slot 65 in one side wall 66 of a box-shaped casing 67 and engages an interlock slider 68 which is guided in the casing. Slider 68 is pivotally mounted near its rear end at 69, Fig. 3, on the forward end of coupling rod 70, the rearward parts of which are shown in Fig. 1. The forward end of rod 70 is guided by passing through an aperture 71 in the rear wall of box casing 67.

In the preferred arrangement here illustrated, the rear end of rod 70 is connected, via an adjustable connection at 70a, with a pivot pin 72 on the end of an arm 73 which is rigidly mounted on the same pivot shaft 32 that forms the axis of and turns with the swinging support legs 31. Thus, coupling rod 70, and slider 68, are in their forward positions when the supporting legs are in their operative forward and lowered positions, and are in their rearward positions (Fig. 3) when the supporting legs are in their rearward and upper inoperative position (dotted lines in Fig. 1).

Figure 3:
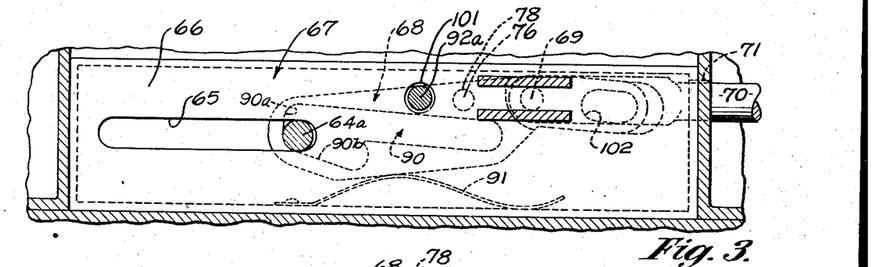
Fig. 3 is a vertical section taken as indicated by line 3—3 on Fig. 2, showing the parts of the interlock mechanism in the same position as in Fig. 2.

When the trailer support is inoperative, raised and to the rear, and the king pin is locked to the trailer, the locking mechanism is in the position shown in full lines in Fig. 2 and the interlock slider is in the position shown in Fig. 3. In this position slider 68 is to the rear and the end 64a of arm 64, then in its rearmost position in slot 65, engages the forward end 90a of the longitudinal slot 90 in slider 68. In this position the slider is supported by the leaf spring 91, and the lower rearwardly sloping wall 90b of slot 90 is pressed up against arm end 64a. Arm 64 is yieldingly held in its rearmost position by the rather strong spring 60 which is attached to that arm and also to the arm 92 of a locking lever whose function will be afterwards described. In order to move arm 64 forwardly and to retract lock bolt 55 to release locking dog 54 it is necessary to move slider 68 forwardly, and that can only be done by lowering the supporting legs 31.

Thus, as long as the trailer support is not lowered king-pin 22 cannot be unlocked.

Furthermore, forward movement of slider 68 and lowering movement of the trailer support to operative position, are prevented by the manually releasable lock shown in Fig. 2 and designated generally by the numeral 75. As here illustrated in preferred form this lock comprises a locking pin 76 which is normally pressed by spring 77 in a direction to enter its end into a socket 78 in slider 68. The outer end of locking pin 76 is connected by link 79 with a manually operable handle 80 pivoted at 80a on the trailer frame. The extreme end of locking pin 76 is beveled as shown at 76a, and the mouth of socket 78 in the slider is correspondingly beveled as shown at 78a. A dogging plate 81 is pivoted at 81a to the trailer frame and has an aperture in its outer end through which handle 80 passes, as shown in Fig. 7. Outward movement of handle 80 (to or toward the dotted line positions shown in Fig. 2, and toward the left in Fig. 7) tends to lift the end of locking pin 76 out of socket 78. In order to move handle 80 outward it is necessary to lift dog 81 so as to lift its shoulder 81a above the outward path of handle 80. See Figs. 7 and 8. The operator will thus lift dog 81 with one hand and hold it up in a position where the dog shoulder 81b engages the under surface of handle 80, and then with the other hand he can move handle 80 outwardly, under the dog shoulder 81c, until the handle engages the dog shoulder 81d at the outer end of the opening in the dogging plate. This position of the handle is shown in Fig. 8 and indicated by the dash-dot lines designated 80d in Fig. 2. In this position of the handle the extreme end 76a of locking pin 76 is entirely out of socket 78, so that in this position of the handle the slider 68 could move longitudinally without engaging the locking pin at all.

However, the operator must perform other operations before he can disconnect the truck from the trailer, and consequently he must be able to leave locking pin 76 in such a position relative to slider 68 that the slider can subsequently be moved forwardly, without the operator holding the locking pin out. So, having retracted the locking pin by moving handle 80 out to the described limiting position, the operator then moves dogging plate 81 upwardly on its pivot until the lower shoulder 81e presses up against the under face of handle 80, whereupon he releases handle 80 and spring 77 then moves the handle inwardly to such a position as shown in Fig. 9 and as indicated in dotted lines at 80f in Fig. 2, when the handle catches in the hook 81f in the dogging plate. The operator can then leave the handle and the dogging plate in the position of Fig. 9 while he attends to the next sequential operation which results in lowering the supporting legs and moving slider 68 forward.

In this position the locking pin 76 has been let back into socket 78 by a distance not more than the length of the beveled surfaces 76a and 78a. Slider 68 can then move forwardly, as it is not then positively locked against forward movement by locking pin 76, but in moving forwardly it pushes locking pin 76 outwardly a short distance, handle 80 moves outwardly far enough to disengage from dog hook 81f, and the dog immediately falls to the position of Fig. 8, with handle 80 in substantially the position of that figure (80d in Fig. 2). The extreme end of locking pin 76 is then riding on side surface 68a of slider 68, so that the locking pin for the time being cannot move inwardly and handle 80 is thus held in position 80d or thereabouts. In this position of the parts, handle 80 and locking pin 76 can move inwardly to reinsert the end of pin 76 in socket 78 whenever slider 68 moves rearwardly again to the normal position shown in Fig. 2, locking pin 76 being constantly impelled inwardly by spring 77. And when the parts do thus finally move back to the position of Fig. 2, dogging plate 81 immediately drops to its initial and normal position of Fig. 7.

The general functions of the manual locking mechanism, as thus described, are first, to lock slider 68 positively in its normal (rearward) position in which it positively prevents unlocking of the king pin (by preventing release movement of latch 55) and in which it prevents (by direct mechanical connection, as here shown) the lowering of the trailer support to its operative position. None of these parts can be moved without first releasing the manual lock. And, as will appear, the king pin cannot thereafter be unlocked until after the trailer support has been lowered. The manual lock is thus the initial control of all the cooperative unlocking operations (including brake operation, as will appear). And the manual lock is of such a nature that a deliberate, two-handed, operation is necessary to set it to unlocking position, so that it is not likely to be set except by one who knows how, and not unthinkingly by him.

Second, the functioning of the manual lock is such that the operator sets it (unlocked) in such condition that subsequent movement of slider 68, when the trailer support is lowered, resets the locking mechanism in potential condition to automatically lock the slider whenever it comes back to its initial position. And, as will appear, this cannot occur until the trailer has again been raised on the tractor, the king-pin locked in place, and the trailer support then finally raised. As will appear, it is impossible to move the slider back to its rear position until the other parts are all in proper positions to tow the trailer; and then the manual lock operates automatically to lock all the parts in those positions, without any attention from the operator.

Figure 4:
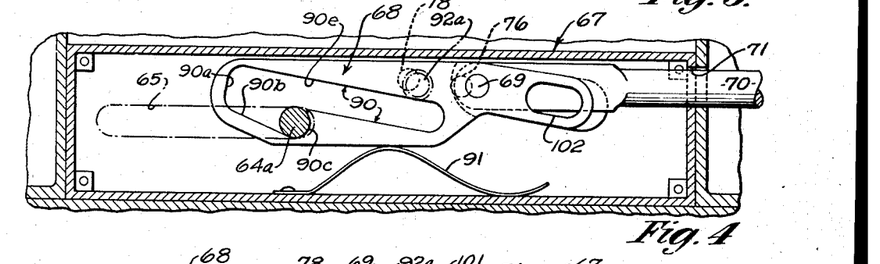
Figs. 4, 5 and 6 are vertical sections taken as indicated by line 6—6 on Fig. 2, and showing several different typical positions of the interlock mechanism.

As the supporting legs move downwardly and forwardly slider 68 first reaches the position shown in Fig. 4. In this position the slider has moved forwardly, and upwardly under the influence of spring 91, so that the arm end 64a is then caught in the forwardly facing hook 90c at the rearward end of the sloping lower wall 90b of slot 90. As the slider then moves further forwardly, arm 64 is moved forwardly with it against the tension of spring 60. Slider 68 moves off spring 91 but is temporarily supported during this final forward movement by its hook engagement with the arm. Thus, in its forward movement slider 68 finally reaches the forward position shown in Fig. 5 at the time supporting legs 31 reach their final trailer-supporting position shown in full lines in Fig. 1.

Figure 5:
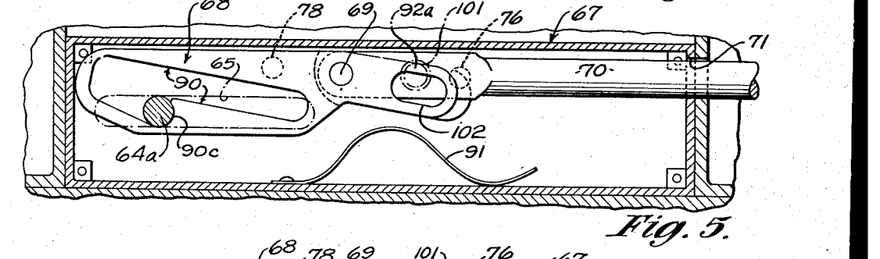

The parts of the interlocking mechanism are then in the positions shown in Fig. 5, and arm 64 and latch bolt 55 are in the positions shown in dotted lines in Fig. 2. In that position of latch bolt 55, the inclined surface 55b at its outer end is adapted to be engaged by tip 54b of locking dog 54 as the locking dog swings toward its open position shown in dotted lines in Fig. 2. Thus, with the parts in the positions just previously explained, and with the trailer braked (its braking in cooperation with lowering of the supporting legs is to be described), king bolt 22 will move forwardly relative to the trailer when the tractor drives forwardly, locking dog 54 will be swung from its full line position to its dotted line position in Fig. 2, and latch bolt 55 will momentarily be pushed back slightly beyond the position shown in dotted lines in Fig. 2, as the locking dog passes it. This temporary displacement of the latch bolt throws arm 64 momentarily a short distance to the left of the dotted line position in Fig. 2, and its end 64a moves to the left from the position shown in Fig. 5 to that shown in dotted lines in Fig. 6, removing its end from hook 90c. Slider 68 is thus released to swing down to the position shown in Fig. 6 where the upper wall 90e of slot 90 rests on arm end 64a. Immediately this occurs, spring 60 moves arm 64 back to the position shown in full lines in Fig. 6, which is the normal position shown in full lines in Figs. 2 and 3. Also latch bolt 55 is now back in its normal latching position shown in full lines in Fig. 2, but is now held in that position only by spring 60, as slider 68 remains in the forward position shown in Fig. 6 until such subsequent time as supporting legs 31 are raised again to their inoperative position.

If slider hook 90c and its function be omitted from the interlock mechanism, the action of the slider in moving forward will still be to release the coupler lock so that it can be opened by hand or otherwise, although the slider does not act positively to open the lock. The other interlocking operations remain the same as have been described; that is, the coupler lock is held closed as long as the support is inoperative and is released only when the support is in its operative position.

But the supporting legs cannot be raised back to their inoperative position (dotted lines in Fig. 1) until king pin 22 has again been inserted and locked in position at the end of the subsequent operation of picking up the trailer on the truck. This prevention is accomplished by a locking device which can only be released by the action of locking the king pin to the trailer in its normal position. In the arrangement and design illustrated in Fig. 2 this locking device includes a bellcrank lever pivoted at 100 and having one arm 92 engageable by the rear side of finger 56. The other arm 92a has an end adapted to be projected through opening 101 in wall 66 of slider casing 67, and adapted to enter a slot 102 formed in slider 68 when the slider is finally in the forward position shown in Fig. 6, after king pin 22 has been withdrawn. In the particular design as here shown, slot 102 is formed in a part of slider 68 which extends to the rear of slider pivot 69, and as a consequence the locking arm 92a cannot enter slot 102 until slider 68 has dropped from the position shown in Fig. 5 to the position shown in Fig. 6. As explained before, that dropping of the slider is caused by the forward removal of king pin 22. And locking lever arm 92 cannot be moved forwardly by spring 60 until the king pin is removed and finger 56 thrown forwardly. The king pin cannot be removed until lever arm 64 reaches substantially its forwardmost position, with the supporting legs 31 in their operative positions. So, removal of the king pin immediately causes the locking arm 92a to enter slot 102 in the slider, to lock the slider and prevent the return of the trailer support to its raised inoperative position, until the king pin has been reinserted. Slot 102 is a little larger than is necessary for reception of locking arm 92a, in order to allow some leeway and to be certain that locking arm 92a will move to its locking position even though the supporting legs have not been moved fully to the final supporting positions shown in full lines in Fig. 1. If the supporting legs have been moved downwardly and forwardly to a position just ahead of a vertical line they will support the trailer and will take their final forward position when weight is imposed upon them. The relation of slot 102 to locking arm 92a is such that, after locking arm 92a enters, the slider 68 cannot be moved rearwardly far enough to throw supporting legs 31 back of approximately a vertical line, preferably not back to the vertical line. And the relations of latch bolt 55 to locking dog 54, and the slider impelled movements of lever arm 64, are such that dog 54 cannot move forwardly past latch bolt 55 until supporting legs 31 have passed a vertical line in their forward movement.

It may be remarked that it is preferable to lock slider 68 in its forward position only upon removal of the king pin, and not immediately after the slider reaches its foremost position as shown in Fig. 5 and before the king pin is removed. If the slider were locked in its forward position immediately on reaching that position, it would be necessary for the operator to remove and then reinsert the king pin before the trailer support could be raised. By providing only for locking the slider after it has reached its forward position and also after the king pin has been removed, it is possible for the operator to re-raise the trailer supporting legs at any time after lowering them and before he removes the king pin.

We also remark that, in the sequence of functions necessary to the type of interlock and to the type of the whole combination here being described, it is not necessary that the latch bolt 55 be released from its king-pin-releasing position (dotted lines in Fig. 2) by virtue of the outward movement of the king pin. It is only essential that the latch bolt be released by some movement of the king pin which occurs before the king pin reaches its final position on reinsertion; in order that the king-pin shall be finally locked before the support can be raised.

By the foregoing described functions of the interlocking mechanism, the king pin is locked to the trailer at all times when the trailer support is not in its operative trailer supporting position, and the trailer support is locked in its trailer supporting position at all times when the tractor is not fully locked in trailer supporting position, as shown in Fig. 1 and in full lines in Fig. 2. As long as the king pin is out of that operative locked position, locking dog 54 and its finger 56 remain in the position shown in dotted lines in Fig. 2 (a spring 54c preventing accidental displacement from that position), latch bolt 55 and lever arm 64 remain in the position shown in full lines in Fig. 2, and slider 68 remains in the position shown in Fig. 6, locked by locking arm 92a. The slider can only be unlocked to move toward the rear and to allow the trailer support to be raised, by swinging the locking dog finger 56 back to the full line position of Fig. 2. This can only be done by reinserting the king pin to the position shown in full lines in Fig. 2. And the insertion of the king pin to that position throws locking dog 54 past latch bolt 55 to the full line position of Fig. 2 where the locking dog is latched to lock the king pin to the trailer.

It will be understood that it is impracticable if not impossible to make the parts of the interlock to such nicety that locking arm 92a will clear slider 68 just as the king pin reaches its final position and as locking dog 54 passes behind latch bolt 55. Some leeway might be allowed by giving the king pin room for further rearward movement in slot 25 after dog 54 passes latch 55; but that would entail an undesirable looseness in the king pin coupling.

The mechanism as described overcomes the difficulty. The relations are such that locking arm 92a is withdrawn clear from slider 68 at a point in the movement of dog 54 when it has passed the high point on the end of the latch bolt and before the king pin has reached its rearmost position. If the king pin is left in such a position, with 92a just withdrawn, then dog 54 holds latch bolt 55 out and holds arm 64 forward. Arm 64 then either holds slider 68 to prevent raising of the supporting legs, or if the supporting legs are forced up, the enforced rearward movement of arm 64 forces the latch bolt home, and the beveled latch face 55b forces dog 54 and the king pin to final lock position.

If the king pin has not been backed in far enough to pass the high point on the latch bolt, then of course the legs are held locked in operative position to support the trailer if the truck pulls out from under. However, if on the other hand the operator then backs the king pin clear home, the previously applied pressure will move the legs up as soon as the interlock is released.

Figure 10:
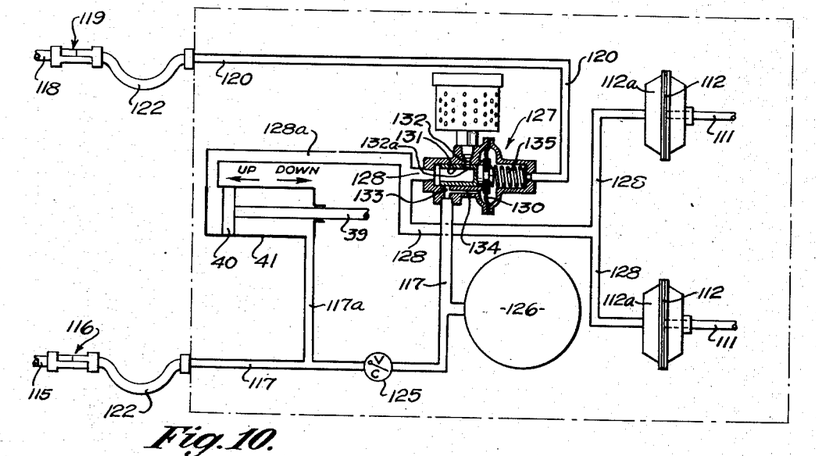
Fig. 10 is a diagram illustrating the several parts of the system which effect cooperation between the trailer support and the trailer brakes, this figure showing the system as operated by super-atmospheric fluid pressure.

The cooperation of the brakes and the brake-operating system with the mechanism which operates the trailer-supporting legs will now be explained. Rear wheels 30, Fig. 1, of the trailer are equipped with brakes 110 of any suitable type and kind and operated in any suitable manner. As illustrated here in Fig. 1 (for a fluid pressure system) the brakes are set by downward movement of brake-operating rods 111, which are moved downwardly by application of pressure to diaphragms 112. Fig. 10 shows the system diagrammatically. Support-operating cylinder 41, piston 40 and rod 39 have already been mentioned. Movement of piston 40 to the right in the diagram of Fig. 10, corresponding to the movement of that piston downwardly and to the right in Fig. 1, lowers supporting legs 31 to their operative position. Movement of the piston in the opposite direction raises the legs to their inoperative position.

In any of the usual pressure-operated brake systems, the tractor or truck is provided with some suitable source of air or other fluid pressure (not shown here), and that fluid pressure is conducted through a supply line 115 (see Fig. 10) to a point near the rear end of the truck where it is connected by a disconnectible coupling 116 to the pressure supply line 117 on the trailer. The truck also has a service or control line 118, controlled on the truck by a suitable brake control valve (not shown here) and which functions to vary the pressure in the service line to operate the brakes. The usual arrangement is such that when the full fluid pressure is present in the service or control line the brakes are released, the brakes being applied by reduction of service line pressure. The service line 118 on the truck is connected with service line 120 on the trailer via a disconnectible coupling 119. Shut-off valves, such as shown at 121 in Fig. 1, are usually provided at the end of the truck lines adjacent the couplings, and hoses such as shown at 122 form flexible connections between the couplings and the lines on the trailer.

In a usual pressure operated system the trailer supply line 117 leads through a check valve 125 to a reservoir 126 and to the triple valve 127. From valve 127 a line or lines 128 lead to the diaphragm chambers 112a. The general function of valve 127 is to apply pressure from supply line 117, or from reservoir 126 if the supply line is disconnected at 116, to the diaphragm chambers to set the brakes whenever pressure is reduced in service line 120; and to exhaust pressure from the brake-operating diaphragms to release the brakes when pressure is again applied through service line 120.

The form of valve 127 as here shown is merely diagrammatic and typical. Pressure applied through service line 120 is exerted on the right hand side of valve diaphragm 130 to move the sliding valve 131 toward the left and to connect air port 132 with line 128 going to the brake diaphragms. In this brake releasing position of the valve pressure port 133 is cut off from line 128. Pressure from supply line 117 is applied via passage 134 to the left-hand side of diaphragm 130, and with equal pressures applied to opposite sides of the diaphragm spring 135 moves and holds the diaphragm and valve to the left. Upon reduction of pressure in service line 120 by a suitable amount, pressure on the right-hand side of diaphragm 130 is reduced and the pressure on the left-hand side of that diaphragm moves it toward the right. By that movement valve port 132a is moved out of register with atmospheric port 132, and supply pressure port 133 is uncovered and put into communication with lines 128 leading to the brake diaphragm chambers, to set the brakes.

The brake operating and control system which has been described is typical of systems which are in use. It is a feature of our present invention that it is capable of application to these commonly used brake control systems, either operated by super-atmospheric pressure as is now being described, or operated by sub-atmospheric pressure as will be described. In such a pressure operated system as is now being described, the right-hand end of support-operating cylinder 41 is connected by line 117a directly to supply line 117 ahead of check valve 125. (It may be remarked that in some systems this check valve is physically incorporated in the structure of triple valve 127; it is here shown as physically separate for clarity of illustration and description. By virtue of this connection 117a pressure is applied to the right-hand side of piston 40, to raise or tend to raise supporting legs 31 at all times that pressure is present in supply line 117. Under normal operating conditions pressure is always present in that supply line except when coupling 116 is disconnected preparatory to uncoupling the trailer from the truck and while the trailer remains uncoupled from the truck.

The left-hand end of leg operating cylinder 41 is directly connected by a line 128a with the line 128 which applies pressure to the brake diaphragms under control of valve 127. Thus, the system is such that whenever, from any of various controlling causes, brake setting pressure is applied to the brake diaphragms, pressure is also applied to the left hand end of cylinder 41 to move, or tend to move piston 40 toward the right and thus to lower supporting legs 31.

The general cooperative functions of all the cooperating and interlocked mechanisms are now to be described.

To drop the trailer the driver goes through the usual operations of getting the trailer into the chosen position and then setting the brakes. By doing that he has applied pressure to the left hand end of cylinder 41, simultaneously with brake setting. Pressures are thus balanced on piston 40, and the supporting legs are held elevated by their mechanical connection to slider 68, the slider being still locked by locking pin 76.

To drop the supporting legs to their fully operative position and release the king pin, so that the tractor can be driven out from under the trailer, the operator has only to release lock 75 by pulling handle 80 out and dogging it in the position 80f, and to break the hose couplings 116 and 119. The order in which he performs these manual operations is not mandatory, but preferable that lock 75 be first released. When the lock is released, the weight of the legs may or may not be sufficient to force locking pin 76 out of socket 78; if so, the legs then drop to or near a vertical hanging position; if not, the legs still remain elevated until the hose coupling 116 on the supply line is broken. Immediately that is done, with lock 76 released, pressure is exhausted from the right hand end of cylinder 41 and the pressure at the left side of piston 40 immediately forces the piston to the right and moves the legs to their fully operative position. When the legs reach that position the king pin lock is unlocked as before explained. The tractor can then be driven away.

If the operator should by any chance forget to release lock 75 he will be unable to pull the king pin away from the trailer, even though he has broken the hose couplings. If, on the other hand he should release lock 75 and overlook breaking the couplings, he still cannot drive the tractor away from the trailer unless the legs have fallen by their own weight to the fully operative position which will move slider 68 far enough forward to release the king pin lock. And if he should drive the tractor away under those last mentioned conditions, the hose connections may be made of such length that they will be pulled apart and the legs forcibly held by air pressure in their final positions before the forward end of the trailer drops off the tractor saddle 21. This last provision, however, is not usually made, as the king pin lock under no circumstances can be released until the legs are in fully operative position.

The trailer is left in the condition now described. Removal of the king pin has locked slider 68 forward (by lock 92a) and the supporting legs in their operative position. Continued pressure from tank 126 holds the brakes set and also holds the supporting legs in operative position. If the trailer stands so long that operating pressure has leaked from tank 126, the supporting legs are still locked by 92a until the king pin is subsequently reinserted and locked in place.

To pick up the trailer again and make ready to drive it away, the operator needs only to back the truck under the trailer, and the king pin into place, in the usual manner; and then couple up the hoses. The act of backing the king pin into place automatically locks the king pin and unlocks the interlocking slider 68 so that the supporting legs can then be moved rearwardly and upwardly to their inoperative positions. However, for the time being, the supporting legs are still held in their lowered operative position by air pressure on the left hand side of piston 40.

The operator then couples the two couplings 116 and 119. Immediately on coupling 116, and opening the valve at the coupling, pressure is again applied to trailer supply line 117 and is thus again applied to the right hand side of piston 40, the piston then being in pressure balance. When coupling 119 is coupled and its valve opened, the immediate action may depend upon the position in which the operator has set the brake control valve in the cab of the truck. If the control valve has been set to exhaust pressure from service line 120 and to set the trailer brakes, then piston 140 and the supporting legs will remain for the time being in their lowered operative position. But if the brake control valve has been set in position to admit pressure to service line 120, triple valve 127 will immediately act to exhaust pressure from the brake diaphragms and also from the left hand side of piston 40. The brakes will thus be immediately released and the supporting legs simultaneously raised to their inoperative position. If the operator sets his brake control valve to brake releasing position after he has coupled up the hoses, the raising of the supporting legs will be simultaneous with the action of trailer brake release which is preparatory to driving away.

And when the supporting legs have once been raised to their inoperative position, and interlocking slider 68 once drawn back to its normal position shown in Fig. 2, then the lock 75 automatically locks the slider and the supporting legs in their rearward positions. When once so locked, subsequent manipulation of the braking system to apply the trailer brakes during travel cannot cause or allow the lowering of the supporting legs to their operative positions, because of the lock at 75. And it is also important to note that, as long as the trailer is coupled to the truck, the pressure from supply line 117 constantly tends to hold the supporting legs up, and the intermittent application of pressure to the left hand side of piston 40 when the brakes are applied only balances the pressure on the piston. The pressure at the left hand side of the piston never tends positively to move the supporting legs down until and unless pressure is exhausted from supply line 117; and that pressure is normally never exhausted except when the trailer is uncoupled.

Figure 11:
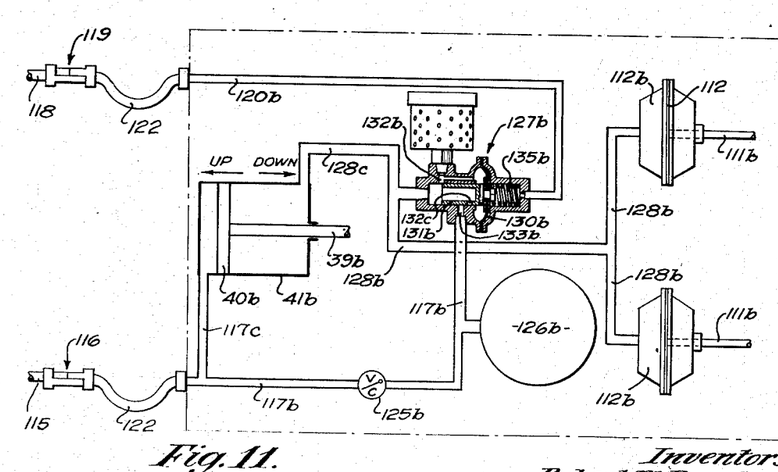
Fig. 11 is a similar diagram showing a system as operated by sub-atmospheric fluid pressure.

The application of our improved system to use with a vacuum (sub-atmospheric pressure) operated brake system is indicated diagrammatically in Fig. 11. Parts which are the same as those shown in Fig. 10 are indicated by the same numerals, analogous parts being indicated by like numerals with the suffix "b." The operation of the vacuum system is substantially the same as that of the pressure system, except that the parts are controlled by pressures less than atmosphere rather than greater than atmosphere. The vacuum supply line 117b runs through check valve 125b and to triple valve 127b. Vacuum service line 120b runs to valve 127b at the right hand side of diaphragm 130b. As long as the brake control valve on the truck is set to maintain vacuum in line 120b, the movable valve 131b is held in a position to connect atmospheric port 132b with the line or lines 128b which go to vacuum chambers 112b, and the brake rods 111b are released to release the brakes. From the brake line 128b a branch or connecting line 128c goes to the right hand end of cylinder 41b. The left hand end of cylinder 141b is connected by line 117c with service or supply line 117b, so that, as long as the trailer is coupled to the truck and in normal operation, vacuum is continuously applied on the left hand face of piston 40b. Piston 40b, piston rod 39b and cylinder 41b, bear the same relation to the supporting legs as that shown in Fig. 1 for the cylinder and piston which has been previously explained.

With the brake control valve set to release the vacuum operated brakes, atmosphere is present at the right hand side of piston 40b and tends to hold the supporting legs up because of the vacuum present at the left of the piston. When the brake control valve is set to relieve the vacuum in service line 120b, valve spring 135b moves valve 131b to the left, cutting off atmosphere port 132b and moving valve port 132c into register with vacuum port 133b, and thereby applying vacuum to the brake lines 128b and the cylinder line 128c. As a result, every time the brakes are applied, vacuum is simultaneously applied to the right hand side of the support-operating piston 40b. However, as long as vacuum is being applied to the left hand side of the piston, application of vacuum to its right hand side merely balances the pressure and does not tend positively to move the supporting legs down; and, moreover, the supporting legs are positively locked against downward movement by the mechanical lock which has been previously explained.

It will be seen that the vacuum actuated system operates in fundamental essentials in the same manner as the pressure operated system. The functions of the whole cooperative and interlocked system of parts are the same, and the same operations and actuations take place under control of the operator as hereinbefore described. As is indicated by the foregoing, the term fluid pressure as used herein and in the following definitions of our invention unless otherwise qualified is intended to include both super-atmospheric and sub-atmospheric pressure.

Figure 12:
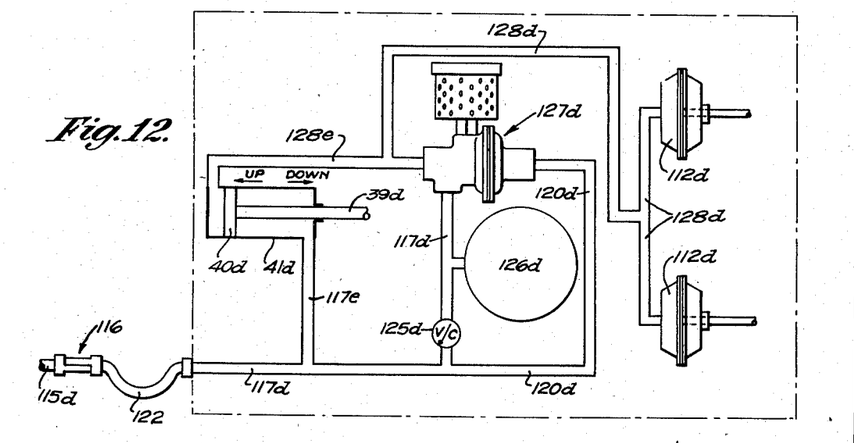
Fig. 12 is a similar diagram illustrating cooperative action of trailer support and brakes in a system involving only a single connection between tractor and trailer.

Fig. 12 illustrates how the supporting leg and the brakes may be cooperatively actuated with only a single fluid pressure connection between the truck and trailer. In this case the system is illustrated as being actuated by pressure above atmosphere. Here the single line 115d on the truck is a combined pressure supply and control line, connected via coupling 116 and hose 122 to line 117d on the trailer. Line 117d runs through check valve 125d to tank 126d and to the initial pressure port of triple valve 127d which is here illustrated as being the same in structure and function as that illustrated in Fig. 10. Instead of the triple valve being controlled by a separate control line, as in Fig. 10, the control connection in Fig. 12 comprises the line 120d which connects line 117d at a point ahead of check valve 125d, with the right-hand end of control valve 127d. Lines 128d connect the left-hand end of the triple valve with the brake chambers 112d, and the line 128d connects the left-hand end of the triple valve to the left-hand end of cylinder 41d. A line 117e permanently connects the right-hand end of cylinder 41d with the combined pressure supply and control line 117d at a point ahead of check valve 125d.

With normal pressure present in line 117d, that pressure is fed to tank 126d and to the pressure port 133 (see Fig. 10) of the triple valve. The normal pressure is also fed through connecting line 120d to the triple valve at the right-hand side of its diaphragm 130 (see Fig. 10) to hold the valve in the left-hand position shown in Fig. 10 and thus to cut off pressure from the brake chambers and from the left-hand end of cylinder 41d, and to apply atmosphere thereto. When pressure is reduced in the control line 115d, or 117d, the reduction of pressure at the right-hand side of the diaphragm allows the triple valve to move to the right, applying pressure from pressure tank 126d to the brakes and also to the left-hand end of cylinder 41d.

Piston 40d and its piston rod 39d are connected to the supporting legs, and the supporting legs are connected to and interlocked with the coupler, in the same manner as before described. The cooperative functions of the complete system of which Fig. 12 shows a part, are the same as that which has been described in connection with Fig. 10. The only substantial structural difference is that there is here but a single connecting line between the truck and trailer; but the whole system of cooperative inter-action is the same as before described.

All of the systems which have now been so far described have included as one feature the actuation of the trailer-support by the same power medium that actuates the trailer brakes, and also have included the cooperative actuation of the support and brakes. In certain of the broader aspects of our invention it is not necessary that the trailer support be actuated in cooperation with the brakes, or that the power medium for the support and brakes be the same. The trailer support may be actuated by any suitable and independent power medium.

Figure 13:
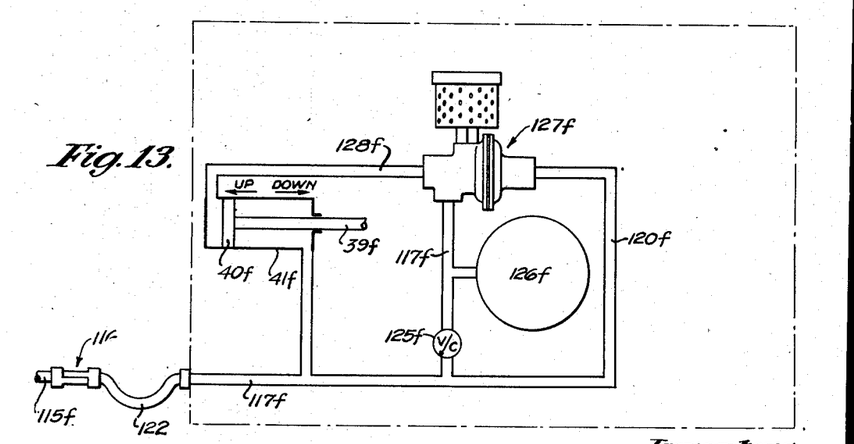
Fig. 13 is a similar diagram illustrating power actuation of the trailer support independently of the trailer brakes.

Fig. 13 for instance shows how the support operating piston 40f may be operated independently. In this figure the parts of the support-operating and control system which are similar to those shown in Fig. 12 are denoted by similar numerals with the suffix f. By comparison of these two figures it will be seen that Fig. 13 makes the same showing as Fig. 12, except to omit the brake connecting and operating parts 128d and 112d. The action of the triple valve 127f being the same as before described, it will be seen that the actuation and control of the leg-operating piston 40f, through its independent supply and control line 115f and 117f, is the same as has been described in connection with Fig. 12.

Further, in connection with Fig. 13, the brake system for the trailer may be actuated and controlled in any desired manner and by any suitable power, as for instance by any conventional fluid pressure or electrical or mechanical system. If fluid pressure actuation of the brakes is used, that fluid pressure system may have its own individual tank on the trailer, or it may utilize the same tank 126f which is utilized in the support-operating and control system.

The system of Fig. 13, when applied to the trailer support and the trailer support interlocked with the draft coupler as in the manner before described, operates in all essentials like the complete system which has been described in connection with Fig. 10 or Fig. 12, except that the brakes are not cooperatively actuated and controlled with the trailer support. The trailer support is however actuated and controlled in the same manner; the support being raised by applying pressure to line 117f and exhausting pressure from the left-hand end of cylinder 41f by the action of the triple valve 127f, and the support being lowered by lowering or exhausting pressure from line 117f, either by valvular control on line 115f or by breaking the coupling at 118.

Figure 14:
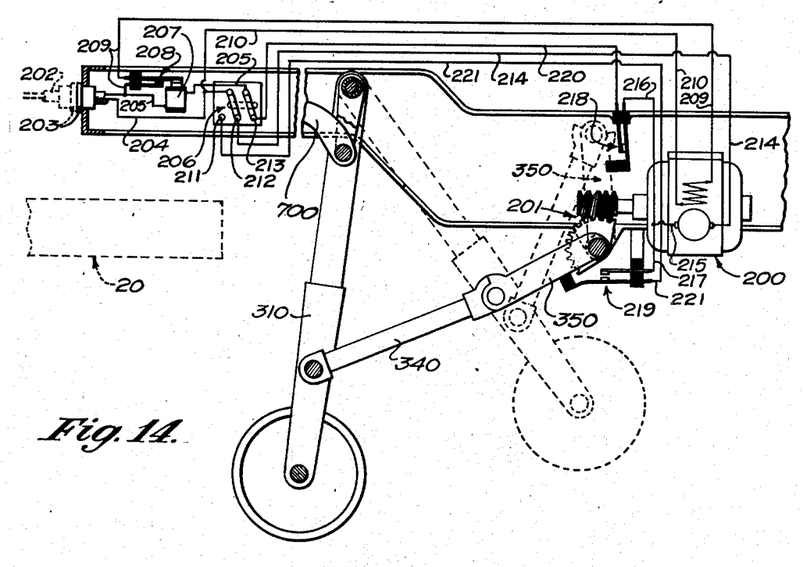
Figs. 14 and 15 are diagrammatic views illustrating typical electrical power actuation of the trailer support.
Figure 15:
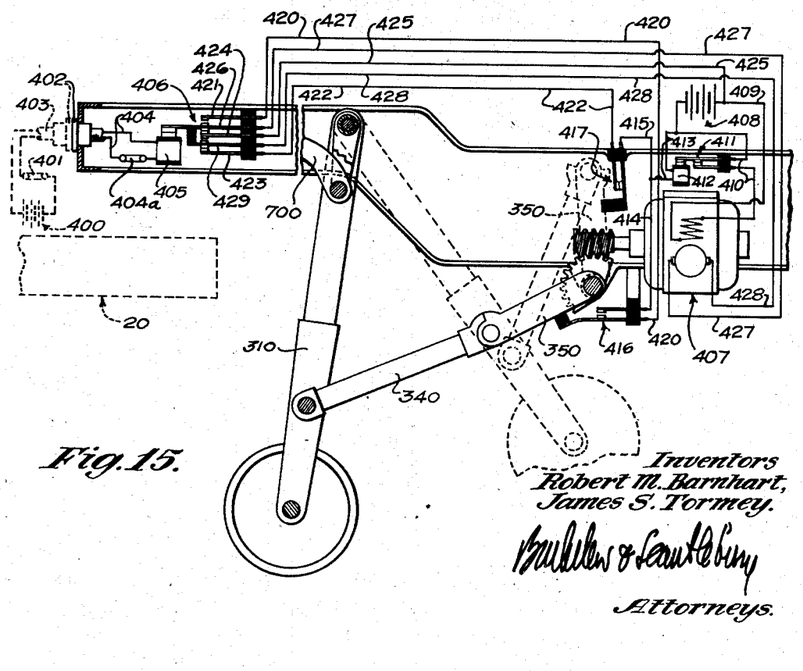

Figs. 14 and 15 show illustrative electrical means for operating the trailer support, which electrical means may be independent of brake operation and control. The electrical systems shown in these figures are to be taken only as indicative, as many different circuitings may be devised to accomplish the same function.

In Fig. 14, which is more or less diagrammatic, the pivoted supporting leg is shown at 310, and the leg supporting links at 340 and 350. The connecting rod which interconnects with the mechanism for interlocking with the coupler is shown at 700. All these parts are shown substantially the same as before described, and are intended to cooperate with the interlock mechanism and the coupler as before described. An electric motor for operating the support up and down is shown at 200, drivingly connected with pivoted link 350 through such gearing as shown at 201. Current for operating the electrical system is derived from any suitable source on truck 20, via cable 202 and a disconnectible coupler 203. From the coupler current is supplied to the two main power leads 204 and 205 on the trailer which lead directly to the two arms of a three-pole reversing switch 206, wire 205 leading through a relay switch magnet 207. The relay switch 208 is designed to be open when magnet 207 is deenergized and closed when the magnet is energized. From lead wire 205 a branch wire 209 leads through relay switch 208 to one of the windings, say the field of motor 200; and wire 210 leads back from that same winding to the other main power lead 204. That winding of the motor will thus only be energized when relay switch 208 is closed, which occurs only when magnet 207 is energized by flow of current through line 205 and reversing switch 206. The three contacts 211, 212 and 213 of the reversing switch are connected as follows. The middle contact 212 is connected by wire 214 to one side of the other winding (say the armature) of motor 200. Wire 215 connects the other side of that same winding with branch wires 216 and 217 which lead, respectively, to one side of two normally closed switches 218 and 219. These two switches 218 and 219 are physically arranged so that switch 218 is adapted to be opened when the supporting leg is in its uppermost position. For instance, the swinging link 350 may engage switch 218 at the end of its upward travel as shown in dotted lines to open the switch. Likewise switch 219 is arranged to be opened when the supporting leg is in its lowered or operative position. Fig. 14 shows the supporting leg in its latter mentioned position with switch 219 open.

From the other side of switch 218 a wire 220 leads to contact 213 of reversing switch 206; and from the other side of switch 219 a wire 221 leads to the third contact 211 of reversing switch 206.

Reversing switch 206 may be either adapted for manual actuation or for actuation cooperatively with any other part of the mechanism which may be desired, for instance with the locking lever 80 of the interlock mechanism. The operation will be described as for manual operation of switch 206. In Fig. 14 the switch is shown in its position to cause raising of the trailer support. In that position a circuit from the main power leads 204 and 205 is completed to one of the motor windings (armature) via wires 214 and 220, switch 218, and wires 216 and 215. Flow of current in lead 205 closes relay switch 208, and a circuit to the other winding (field) of the motor 200 is completed via wire 209 and switch 208 and wire 210. When the motor is thus energized, the arrangements are such that rotation of the motor moves the supporting leg up—from the position shown in full lines in Fig. 4 to the position shown in dotted lines. At the end of the upward movement switch 218 is opened, thus breaking the circuit to one of the motor windings. At the same time, the relay switch 208 opens because of cessation of flow in lead 205, and the circuit to the other motor winding is broken.

To lower the trailer support, switch 206 is thrown to its other position, where its arms make contact with contacts 211 and 212. The circuit to the first mentioned motor winding (armature) then proceeds from contact 212 via wire 214, and thence from the motor via wires 215 and wire 217 to switch 219, which is now closed. From switch 219 the circuit is completed via wire 221 back to contact 211 of the reversing switch. Flow of current in lead 205 again closes relay switch 208, and the circuit is completed to the other motor winding (field) as before. The direction of current feed to the first mentioned winding is now in a reverse direction, and as a consequence motor 200 rotates in a direction to lower the trailer support. When the support reaches its fully lowered position, switch 219 is opened, breaking the motor circuit at that point, and causing the circuit to the other motor winding to be opened at relay switch 208.

In cooperation with the remainder of the described mechanism—the coupler, the interlock between the support and the coupler, and the manually operated locking handle 80—this last described form of support operating mechanism operates much the same as before described. The support cannot be lowered until the lock operated by handle 80 has been released. It also cannot be lowered except while the coupling at 203 is connected, as the power for operating the leg is derived through that coupling. Consequently the leg cannot be lowered except when the tractor is fully coupled with the trailer. Once the support is lowered, then the coupling at 203 may be disconnected and the tractor pulled away from the trailer. In coupling up, the supporting leg cannot be raised until the tractor has been locked to the trailer, because of the interlock mechanism before described. Also the leg cannot be raised until coupling 203 has been coupled up. When that is done, then the operator may raise the supporting leg by throwing switch 206 to its proper position.

Fig. 15 shows another form of electrical operation of the trailer support, which is actuated and controlled by virtue of coupling and uncoupling the electric coupling between the tractor and trailer. In this figure the supporting leg and its pivoted operating links are designated by the same numerals as in Fig. 14.

Current for control of the electrically operated mechanism is obtained from the tractor from any suitable source, as from a battery 400, under control of switch 401, if desired. And disengageable coupler 402 connects the truck lines or cable 403 with the control lines 404 on the trailer. Circuit 404 leads to relay switch magnet 405, energization of which moves the reversing switch 406 to the position shown in Fig. 15. In this position of the reversing and controlling switch 406 the support-operating motor 407 is adapted to be rotated in a direction to raise the supporting leg.

The trailer carries a suitable source of electric power as shown by battery 408. The field winding of motor 407 is connected with the battery by wire 409, and by wire 410 which includes the relay switch 411, this switch being closed by the relay magnet 412 when that magnet is energized. Magnet 412 is included in the circuit comprising wires 413 and branch wires 414 and 415 which lead respectively to the two normally closed switches 416 and 417 which are similar in placement and operation to the two switches 218 and 219 of Fig. 14. From switch 416 a wire 420 leads to contact 421 of control switch 406; and from switch 417 a wire 422 leads to contact 423 of control switch 406. The center contact 424 of the control switch is connected by wire 425 to battery 408.

In the switch position shown in Fig. 15, motor 407 is energized to raise the supporting leg. In the lowered position of the leg switch 416 is open and switch 417 closed. Current flows from the battery through wire 425 and center contact 424 of switch 406 and thence to movable contact 426 and via wire 427 to the motor armature winding; and thence via wire 428 to the other movable switch contact 429, and through switch contact 423 and wire 422, switch 417, wire 415, and wire 413 and relay magnet 412 to the battery. Energization of magnet 412 closes the field circuit of the motor, and the motor rotates in a direction to raise the supporting leg. When the supporting leg reaches its upper position, switch 417 opens, breaking the armature winding circuit and deenergizing relay magnet 412 to break the field winding circuit. Thus, whenever relay magnet 405 is energized, as by engaging the coupling at 402 or by manipulation of a control switch on the tractor, or a control switch such as indicated by 404a on the trailer, the supporting leg will be raised from its lowered position to its upper inoperative position.

By deenergizing the relay magnet 405 by any of the control means, or by breaking the coupling at 402, the two movable contacts of control switch 406 go to their other positions, to make contact with stationary contacts 421 and 424. In that position of switch 406 current from battery 408 flows through 425; contact 424 and contact 429, wire 428, the motor armature winding, wire 427, contact 426, contact 421, wire 420, switch 416 (which is then closed, the leg being up) and wires 414 and 413 back to the battery. The motor field winding circuit is closed as before explained, and the motor now rotates in a direction to lower the supporting leg; the motor circuit being broken at the end of the operation by switch 416 being opened.

The supporting leg being interlocked with the coupler mechanism by bar 700, the overall operation and functions of the form shown in Fig. 15 are similar to that of the forms first explained, and to that of the forms explained in connection with Figs. 12 and 13. As in Figs. 13 and 14, the operation of the supporting leg of Fig. 15 may be independent of the brake operation; but as in Figs. 10, 11, 12 and 13 the operation of the leg in Fig. 15 is under control of coupler 402 which couples the source of energy on the truck with the trailer. If switches 401 and 404a are omitted or kept closed, the operation of the leg is completely under control of coupling 402. Thus, as has been explained in connection with those other figures, the trailer support of Fig. 15 cannot be moved up and down unless the truck is draft-connected with the trailer and the coupler locked, and also unless the coupling at 402, or its equivalent switches, are manipulated. And further, similar to the operation in those other figures, breaking of the coupling at 402 automatically causes the supporting leg to be lowered; and the supporting leg cannot be raised until the truck is fully draft-connected with the trailer and also until the coupling 402 is closed.

From what has been said regarding the form of Fig. 15 it will be recognized that the line coupling of 402 ultimately controls the release of the draft coupler. Breaking the power supply at that coupling causes the lowering of support 310, and, as has been explained, the draft coupler cannot be opened until the support is lowered. The condition of the coupling (whether made or broken) controls the release of the draft coupler, through a mechanism which comprises the support actuating devices and the interlock devices which act between the support and the draft lock. The action of that chain of mechanism is such that the draft lock is released as a result of breaking the coupling 402; and the draft lock is held closed whenever coupling 402 is made, because the immediate result of making coupling 402 is to raise the support and hold it raised, and therefore, through the interlock, to hold the draft coupler closed.

The same functions are inherent in the forms first described; for instance that of Fig. 10. As has been explained, as long as the support is up the draft lock is held closed by the interlock. The support is caused to move down by the unbalance of forces on the support actuating motor when coupling 116, or both couplings 116 and 119, are broken. Until that occurs the draft coupler is held closed; when it occurs the draft coupler is released. Thus, in the pressure actuated forms the condition of the coupling, whether made or broken, has ultimate control of the draft lock release.

We claim:

1. In a tractor and semi-trailer combination in which the tractor and trailer are provided with interengaging draft elements including a releasable draft lock operable to lock the two vehicles together, in which the trailer is provided with a support actuatable between supporting and non-supporting conditions by an operating means independent of the tractor draft element, and in which the trailer is provided with a brake system of the type involving a pressure supply and control line means wherein pressure variations cause application of pressure to brake actuating mechanism to set the brake; the combination of means for actuating the support including a motor element adapted to be pressure actuated in either of two directions, means whereby pressure existing in the line means tends to cause motor operation in a direction to actuate the support into non-supporting condition, and means whereby brake setting pressure existing in the brake actuating mechanism is applied to the support actuating motor to cause motor operation in a direction to actuate the support into supporting condition.

2. In a semi-trailer adapted to be coupled to and supported on a tractor, the semi-trailer being provided with a support actuatable between supporting and non-supporting condition, and also being provided with a brake system of the type involving a power supply and control line means wherein power variations cause application of power to brake actuating mechanism to set the brake; the combination of means for actuating the support including a motor element adapted to be power actuated in either of two directions, means whereby power existing in the line means tends to cause motor operation in a direction to actuate the support into non-supporting condition, and means whereby brake setting power applied to the brake actuating mechanism is also applied to the support actuating motor to cause motor operation in a direction to actuate the support into supporting condition.

3. In a tractor and semi-trailer combination in which the tractor and trailer are provided with interengaging draft elements including a releasable draft lock operable to lock the two vehicles together, in which the trailer is provided with a support actuatable between supporting and non-supporting conditions by an operating means which is independent of the tractor draft element, and in which the trailer is provided with a brake system of the type involving a pressure supply line and a control line wherein pressure variations cause application of supply line pressure to brake actuating mechanism to set the brake; the combination of means for actuating the support including a motor element adapted to be pressure actuated in either of two opposite directions by fluid pressure, a fluid pressure connection between the pressure supply line and the motor in such manner that pressure existing in the supply line tends to cause motor operation in a direction to actuate the support into non-supporting condition, and a fluid pressure connection between the brake actuating mechanism and the support motor in such manner that brake setting pressure existing in the brake actuating mechanism is applied to the support motor to cause motor operation in a direction to actuate the support into supporting condition.

4. In a semi-trailer adapted to be coupled to and supported on a tractor, the semi-trailer being provided with a support actuatable between supporting and non-supporting condition, and also being provided with a brake system of the type involving a power supply line and a control line wherein power variations cause application of the supply line power to brake actuating mechanism to set the brake; the combination of means for actuating the support including a motor element adapted to be power actuated in either of two opposite directions, a power connection between the power supply line and the motor in such manner that power existing in the supply line tends to cause motor operation in a direction to actuate the support into non-supporting condition, and a power connection between the brake actuating mechanism and the support motor in such manner that brake setting power existing in the actuating mechanism is applied to the support motor to cause motor operation in a direction to actuate the support into supporting condition.

5. In a combination which includes two inter-coupled vehicles which are provided with inter-engaging draft elements including a releasable draft lock operable to lock the two vehicles together, and a power transmitting line leading between the two vehicles and having a coupling which is connectible and disconnectible between them to allow separation of the vehicles; the improvement which comprises means assuming one or the other of two positions in response to the condition of connection or disconnection of the power line coupling, and operating means controlled in dependence on one of the positions of said means for effecting the release of the draft lock.

6. In a combination which includes two inter-coupled vehicles which are provided with inter-engaging draft elements including a releasable draft lock operable to lock the two vehicles together, and a power transmitting line leading between the two vehicles and having a coupling which is connectible and disconnectible between them to allow separation of the vehicles; the improvement which comprises means assuming one or the other of two positions in response to the condition of connection or disconnection of the power line coupling, and operating means controlled in dependence on one of the positions of said means for holding the draft lock closed whereby the draft lock is releasable only in dependence on the other of the positions of said means.

7. In a combination which includes two inter-coupled vehicles which are provided with inter-engaging draft elements including a releasable draft lock operable to lock the two vehicles together, and a power transmitting line through which power is supplied from one vehicle to the other and which is connectible and disconnectible between the vehicles to allow their separation; the improvement which comprises means assuming one or the other of two positions in response to the condition of existence or non-existence of power in the line, and operating means controlled in dependence on one of the positions of said means for effecting the release of the draft lock.

8. In a combination which includes two inter-coupled vehicles which are provided with inter-engaging draft elements including a releasable draft lock operable to lock the two vehicles together, and a power transmitting line through which power is supplied from one vehicle to the other and which is connectible and disconnectible between the vehicles to allow their separation; the improvement which comprises means assuming one or the other of two positions in response to the condition of existence or non-existence of power in the line, and operating means controlled in dependence on one of the positions of said means for holding the draft lock closed whereby the draft lock is releasable only in dependence on the other of the positions of said means.

9. In a tractor and semi-trailer combination in which the tractor and trailer are provided with inter-engaging draft elements including a releasable draft lock operable to lock the two vehicles together, in which the trailer is provided with a support actuatable between supporting and non-supporting conditions by an operating means which is independent of the tractor draft element, and in which the trailer is provided with a brake system of the type involving a pressure supply line and a control line wherein pressure variations cause application of supply line pressure to brake actuating mechanism to actuate it, said lines leading from the tractor to the trailer and being disconnectible to allow their separation; the combination of means for actuating the support including a motor element adapted to be actuated in either of two opposite directions by fluid pressure, a fluid pressure connection between the fluid supply line and the motor in such manner that pressure existing in the supply line tends to cause motor operation in a direction to actuate the support into non-supporting condition, and a fluid pressure connection between the brake actuating mechanism and the support motor in such manner that application of actuating pressure to the brake mechanism tends to cause motor operation in a direction to actuate the support into supporting condition, means whereby the draft lock is held in locked condition selectively by virtue of the support being in non-supporting condition, so that the draft lock is releasable only when the support is in supporting condition, and means whereby the support is locked in supporting condition by virtue of the draft lock being unlocked.

10. In a tractor and semi-trailer combination in which the tractor and trailer are provided with interengaging draft elements including a releasable draft lock operable to lock the two vehicles together in which the trailer is provided with a support actuatable between supporting and non-supporting conditions by an operating means which is independent of the tractor draft element, and in which the trailer is provided with a brake system of the type involving a power supply and control line means wherein power variations cause application of supply line pressure to brake actuating mechanism to actuate it, said line means extending from the tractor to the trailer and being disconnectible to allow their separation; the combination of means for actuating the support including a motor element adapted to be power actuated in either of two directions, means whereby power existing in the line means tends to cause motor operation in a direction to actuate the support into non-supporting condition, and means whereby application of actuating power to the brake mechanism tends to cause motor operation in a direction to actuate the support into supporting condition, means whereby the draft lock is held in locked condition selectively by virtue of the support being in non-supporting condition, so that the draft lock is releasable only when the support is in supporting condition, and means whereby the support is locked in supporting condition by virtue of the draft lock being unlocked.

11. In a tractor and semi-trailer combination in which the tractor and trailer are provided with interengaging draft elements including a releasable draft lock operable to lock the two vehicles together, in which the trailer is provided with a support actuatable between supporting and non-supporting conditions by an operating means independent of the tractor draft element, and in which the trailer is provided with a brake system of the type involving a power supply and control line means wherein power variations cause application of power to brake actuating mechanism to actuate it; the combination of means for actuating the support including a motor element adapted to be actuated in either of two directions, means whereby power existing in the line means tends to cause motor operation in a direction to actuate the support into non-supporting condition, and means whereby application of actuating power to the brake mechanism tends to cause motor operation in a direction to actuate the support into supporting condition, manual means normally locking the support in non-supporting condition, said means being manually settable to release the support, and re-settable by movement of the support to subsequently automatically lock the support upon its subsequently reaching its non-supporting condition, means whereby the draft lock is held in locked condition by virtue of the support being in non-supporting condition, and means whereby the support is locked in supporting condition by virtue of the draft lock being unlocked.

12. In a tractor and semi-trailer combination in which the tractor and trailer are provided with interengaging draft elements including a releasable draft lock operable to lock the two vehicles together, in which the trailer is provided with a support actuatable between supporting and non-supporting conditions by an operating means which is independent of the tractor draft element, and in which the trailer is provided with a brake system of the type involving a pressure supply line and a control line wherein pressure variations cause application of supply line pressure to brake actuating mechanism to actuate it; the combination of means for actuating the support including a motor element adapted to be actuated in either of two opposite directions by fluid pressure, a fluid pressure connection between the fluid supply line and the motor in such manner that pressure existing in the supply line tends to cause motor operation in a direction to actuate the support into non-supporting condition, and a fluid pressure connection between the brake actuating mechanism and the support motor in such manner that application of actuating pressure to the brake mechanism tends to cause motor operation in a direction to actuate the support into supporting condition, manual means normally locking the support in non-supporting condition, said means being manually settable to release the support, and re-settable by movement of the support to subsequently automatically lock the support upon its subsequently reaching its non-supporting condition, means whereby the draft lock is held in locked condition by virtue of the support being in non-supporting condition, and means whereby the support is locked in supporting condition by virtue of the draft lock being unlocked.

13. In a tractor and semi-trailer combination in which the tractor and trailer are provided with interengaging draft elements including a releasable draft lock operable to lock the two vehicles together, and in which the trailer is provided with a support actuable between supporting and non-supporting conditions by an operating means which is independent of the tractor draft element; the combination of an interlock mechanism interposed between the draft lock and the support and acting to hold the draft lock in locked condition whenever the support is in non-supporting condition, and acting to lock the support in supporting condition whenever the draft lock is unlocked, and manually releasable means, in addition to the interlock mechanism, associated with a part which moves the support and adapted normally to lock the support in non-supporting condition.

14. In a tractor and semi-trailer combination in which the tractor and trailer are provided with interengaging draft elements including a releasable draft lock operable to lock the two vehicles together, and in which the trailer is provided with a support actuable between supporting and non-supporting conditions by an operating means independent of the tractor draft element, the combination of an interlock mechanism interposed between the draft lock and the support and acting to hold the draft lock in locked condition whenever the support is in non-supporting condition, and acting to lock the support in supporting condition whenever the draft lock is unlocked, and manually releasable means associated with a part which moves with the support and adapted normally to lock the support in non-supporting condition, said last mentioned means embodying a locking member and means for setting the locking member in position to release the support for movement, the setting means being releasable by such movement to free the locking member to automatically engage and relock the moving support part upon return of the support to non-supporting condition.

15. In a tractor and semi-trailer combination in which the tractor and trailer are provided with interengaging draft elements including a releasable draft lock operable to lock the two vehicles together, and in which the trailer is provided with a support actuatable between supporting and non-supporting conditions by an operating means which is independent of the tractor draft element; the combination of an interlock mechanism interposed between the draft lock and the support and acting to hold the draft lock in locked condition selectively whenever the support is in non-supporting condition, so that the draft lock is releasable only when the support is in supporting condition, power actuated means for causing movement of the support between supporting and non-supporting conditions; a power transmitting line leading from the tractor to the trailer and disconnectible to allow separation of the two vehicles, and means whereby disconnection of the line causes operation of the power actuated means to cause movement of the support to supporting condition.

16. In a tractor and semi-trailer combination in which the tractor and trailer are provided with interengaging draft elements including a releasable draft lock operable to lock the two vehicles together, and in which the trailer is provided with a support actuatable between supporting and non-supporting conditions by an operating means which is independent of the tractor draft element; the combination of an interlock mechanism interposed between the draft lock and the support and acting to hold the draft lock in locked condition selectively whenever the support is in non-supporting condition, so that the draft lock is releasable only when the support is in supporting condition, and to hold the support in supporting condition whenever the draft lock is unlocked, power actuated means for causing movement of the support between supporting and non-supporting conditions, a power transmitting line leading from the tractor to the trailer and disconnectible to allow separation of the two vehicles, and means whereby connection and disconnection of the line causes operation of the power actuated means to cause movement of the support respectively to its non-supporting and its supporting conditions.

17. In a tractor and semi-trailer combination in which the tractor and trailer are provided with interengaging draft elements including a releasable draft lock operable to lock the two vehicles together, and in which the trailer is provided with a support actuatable between supporting and non-supporting conditions by an operating means which is independent of the tractor draft element, and in which the trailer is provided with power actuated brakes; the combination of power actuated means for causing movement of the support between supporting and non-supporting conditions, brake-power controlling line leading from the tractor to the trailer and disconnectible to allow separation of the two vehicles, means whereby connection and disconnection of the brake-power controlling line causes operation of the power actuated means to cause movement of the support respectively to its non-supporting and supporting conditions, and interlocking means acting between the draft lock and the support to hold the draft lock in locked condition selectively whenever the support is in non-supporting condition, so that the draft lock is releasable only when the support is in supporting condition.

18. In a tractor and semi-trailer combination in which the tractor and trailer are provided with interengaging draft elements including a releasable draft lock operable to lock the two vehicles together, and in which the trailer is provided with a support actuatable between supporting and non-supporting conditions by an operating means which is independent of the tractor draft element, and in which the trailer is provided with power actuated brakes; the combination of power actuated means for causing movement of the support between supporting and non-supporting conditions, brake-power controlling line leading from the tractor to the trailer and disconnectible to allow separation of the two vehicles, means whereby connection and disconnection of the brake-power controlling line causes operation of the power actuated means to cause movement of the support respectively to its non-supporting and supporting conditions, and interlocking means acting between the draft lock and the support to hold the draft lock in locked condition selectively whenever the support is in non-supporting condition, so that the draft lock is releasable only when the support is in supporting condition, and acting to hold the support in supporting condition whenever the draft lock is unlocked.

ROBERT M. BARNHART.
JAMES S. TORMEY.

CERTIFICATE OF CORRECTION.

Patent No. 2,363,851. November 28, 1944.

ROBERT M. BARNHART, ET AL.

It is hereby certified that error appears in the printed specification of the above numbered patent requiring correction as follows: Page 11, second column, line 60, claim 13, after the word "moves" insert --with--; and that the said Letters Patent should be read with this correction therein that the same may conform to the record of the case in the Patent Office.

Signed and sealed this 20th day of February, A. D. 1945.

Leslie Frazer (Seal) Acting Commissioner of Patents.